United States Patent Office 3,412,085
Patented Nov. 19, 1968

3,412,085
10,5 - (IMINOMETHANO) - 10,11 - DIHYDRO - 5H-DIBENZO[a,d] - CYCLOHEPTEN - 11,13 - DIONE AND DERIVATIVES
Thomas A. Dobson, St. Laurent, Quebec, and Martin A. Davis, Montreal, Quebec, Canada, assignors to American Home Products Corporation, New York, N.Y., a corporation of Delaware
No Drawing. Filed Sept. 19, 1966, Ser. No. 580,209
5 Claims. (Cl. 260—239.3)

ABSTRACT OF THE DISCLOSURE

This invention relates to novel 10,5-(iminomethano)-10,11 - dihydro - 5H - dibenzo[a,d]cycloheptene - 11,13-diones of the formula:

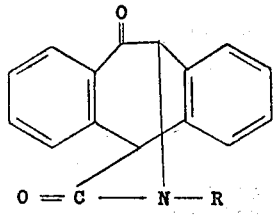

wherein R represents hydrogen or an organic group such as, lower alkyl containing from 1–4 carbon atoms, an aralkyl group containing from 7–10 carbon atoms, a substituted aminoalkyl group containing from 4–9 carbon atoms or a heterocyclic substituted alkyl group containing from 5–8 carbon atoms and from 1–2 hetero atoms. The compounds of this invention are useful as anti-convulsants and as trichomonicidal agents.

This invention relates to novel chemical compounds having useful biological properties and being useful as intermediates in the synthesis of 11-substituted-10,5-(iminomethano) - 10,11 - dihydro - 5H - dibenzo[a,d]cycloheptenes and cyclohepten-13-ones as described in our co-pending U.S. patent applications S.N. 576,207 filed Aug. 31, 1966, and S.N. 568,745 filed July 29, 1966. In particular, this invention relates to 10,5-(iminomethano)-10,11-dihydro-5H-dibenzo[a,d]cycloheptene-11,13-dione and derivatives thereof of the following Formula I:

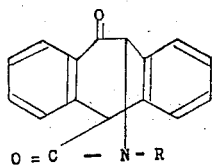

I wherein R represents hydrogen or an organic group such as, lower alkyl containing from 1–4 carbon atoms, an aralkyl group containing from 7–10 carbon atoms, such as, for example, the benzyl, the β-phenethyl, or the trimethoxybenzyl group; a substituted aminoalkyl group containing from 4–9 carbon atoms such as, for example, the dimethylaminoethyl, or dimethylaminopropyl, or the diisopropylaminopropyl group, or a heterocyclic substituted alkyl group containing from 5–8 carbon atoms and from 1–2 hetero atoms, such as, for example, the piperidinoethyl, the morpholinoethyl, or the (N′-methyl-piperazino)ethyl group. The pharmacologically acceptable salts of the basically substituted compounds of formula I are also included in this invention.

One process for obtaining the compounds of Formula I wherein R represents hydrogen, a lower alkyl group, or a lower aralkyl group as defined above consists in treating a solution or suspension of an 11-hydroxy-10,5-(iminomethano) - 10,11 - dihydro - 5H - dibenzo[a,d]cyclohepten-13-one of Formula II wherein R represents hydrogen, a lower alkyl group, or a lower aralkyl group as defined above, in an insert solvent with an oxidizing agent such as, for example, chromic acid, to yield the 10,5-(iminomethano) - 10,11 - dihydro - 5H - dibenzo[a,d]cycloheptene-11,13-dione of Formula I in which R is as defined in this paragraph.

Alternatively, the compounds of Formula I wherein R is as defined originally are prepared by treating 10,5-(iminomethano ) - 10,11 - dihydro - 5H - dibenzo[a,d]-cycloheptene-11,13-dione (Formula I, R=H), obtained by the process described above, with a basic condensing agent and an organic halide of formula RX wherein R represents an organic group as defined above, and X represents a halogen atom of atomic weight greater than 19, to yield the 10,5-(iminomethano)-10,11-dihydro-5H-dibenzo[a,d]cycloheptene-11,13-dione of Formula I wherein R is an organic group as defined above.

The starting materials for the compounds of this invention, the 11-hydroxy-10,5-(iminomethano)-10,11-dihydro-5H-dibenzo[a,d]cyclohepten-13-ones of Formula II wherein R represents hydrogen, a lower alkyl group, or a lower aralkyl group as defined above, may be prepared by the processes described in our co-pending U.S. patent application S.N. 552,387, filed May 24, 1966. In brief, this process entails the addition of bromine to 5H-dibenzo[a,d]cyclohepten-5-carboxamide to produce 10,11-dibromo - 10,11 - dihydro - 5H - dibenzo[a,d]cycloheptene -5-carboxamide. In its turn, this compound is heated in either water or a lower alkanol to produce 11-bromo-10,5 - (epoxymethano) - 10,11 - dihydro - 5H - dibenzo[a,d]cyclohepten-13-one. In its turn this compound is heated with ammonium hydroxide solution or an aqueous solution or suspension of an organic amine of formula H₂NR wherein R represents a lower alkyl group, or a lower aralkyl group as defined above, to obtain the 11-hydroxy - 10,5 - (iminomethano)-10,11-dihydro-5H-dibenzo[a,d]cyclohepten-13-one of Formula II wherein R represents hydrogen, or lower alkyl groups, or lower aralkyl groups as defined above.

More specifically, the compounds of Formula I are prepared as follows. Thus, a solution or suspension of a 11 - hydroxy - 10,5 - (iminomethano) - 10,11 - dihydro-5H-dibenzo[a,d]cyclohepten-13-one of Formula II wherein R represents hydrogen, or lower alkyl groups, or lower aralkyl groups as defined above, in an inert solvent such as, for example, acetone, is treated with a slight molar excess of an aqueous solution of chromic acid, preferably within a temperature range of from 0–20° C. The excess of chromic acid is then destroyed by the addition of a lower alkanol, conveniently ethanol. The mixture is then concentrated in vacuo to small volume and the residue is partitioned between water and a suitable water-immiscible organic solvent, conveniently chloroform. Evaporation of the organic phase and purification of the residue by conventional means such as, for example, chromatography, or crystallization gives the 10,5-(iminomethano) - 10,11 - dihydro - 5H - dibenzo[a,d]cycloheptene-11,13-dione of Formula I wherein R represents hydrogen, or lower alkyl groups, or lower aralkyl groups, as defined above.

Alternatively, a solution or suspension of 10,5-(iminomethano) - 10,11 - dihydro - 5H - dibenzo[a,d]cycloheptene-11,13-dione, prepared as described above, in an inert solvent such as, for example, benzene or xylene or dioxan is treated with one molar equivalent of a basic condensing agent, conveniently sodium hydroxide, and one molar equivalent of an organic halide of formula R—X wherein R represents an organic group as defined above, and X represents a halogen atom of atomic weight greater than 19, at a temperature within the range of 50° to 140° C. for a period of time of up to 24 hours. The reaction mixture is then evaporated to dryness and the residue is purified by conventional methods such as, for example, chromatography, or crystallization, to give the 10,5 (iminomethano) - 10,11 - dihydro - 5H - dibenzo[a,d] cycloheptene-11,13-dione of Formula I wherein R is an organic group as defined above.

The compounds of this invention inhibit the growth of *Trichomonas vaginalis* and are useful as trichomonicidal agents. As such, they may be formulated with suitable excipients in the form of vaginal suppositories or inserts containing from 50–250 mg. of the active ingredient, to be administered two or three times a day for periods of time of up to fourteen days.

The compounds of this invention of Formula I in which R represents hydrogen also possess marked activity upon the central nervous system, in particular anti-convulsant activity, especially against electro-shock, to a very high degree, together with a low order of toxicity. The combination of the above properties makes the compounds useful as anti-convulsant agents. As such they may be formulated into tablets or capsules with excipients such as, lactose, starch, magnesium stearate or magnesium silicate, each tablet or capsule containing from 75–500 mg. of the active ingredient. Such tablets or capsules may be administered from one to four times per day for prolonged periods of time.

The following formulae and examples in which R is as defined above will be illustrative of this invention:

II.

Example 1.—10,5-(iminomethano)-10,11-dihydro-5H-dibenzo[a,d]cycloheptene-11,13-dione An 8 N aqueous solution of chromic acid (1.0 ml.) is added dropwise to a stirred ice-cold suspension of 11-hydroxy - 10,5 - (iminomethano) - 10,11 - dihydro - 5H-dibenzo[a,d]cyclohepten-13-one (500 mg.) in acetone (30 ml.). The mixture is stirred for 20 minutes and then ethanol (0.3 ml.) is added. The mixture is then evaporated to small volume, diluted with water and extracted with chloroform. The chloroform extracts are washed with water, dried and evaporated and the residue is crystallized from methanol to give the title product with M.P. 197–199°C.

Example 2.—12-methyl-10,5-(iminomethano)-10,11-dihydro-5H-dibenzo[a,d]cycloheptene-11,13-dione In the same manner, but using 11-hydroxy-12-methyl-10,5 - (iminomethano) - 10,11 - dihydro - 5H - dibenzo[a,d]cyclohepten-13-one as starting material, there is obtained the title product with M.P. 153–155° C. after recrystallization from methanol.

Alternatively, a solution of 10,5-(iminomethano)-10,11 - dihydro - 5H - dibenzo[a,d]cycloheptene - 11,13 - dione (2.49 g.), prepared as described in Example 1, in dry dioxan (30 ml.), is treated with sodium hydride suspension (450 mg. of a 54% suspension). The mixture is then boiled for 30 minutes and then methyl iodide (1.42 g.) is added. The mixture is refluxed for 6 hours and then cooled and concentrated. The residue is diluted with water and extracted with chloroform, and the chloroform extracts are evaporated to dryness. The residue is crystallized from methanol to give the title product with M.P. 153–155° C.

Example 3.—12 - dimethylaminopropyl-10,5-(iminomethano) - 10,11 - dihydro - 5H - dibenzo[a,d]cycloheptene-11,13-dione A mixture of 10,5-(iminomethano)-10,11-dihydro-5H-dibenzo[a,d]cycloheptene-11,13-dione (2.49 g.), prepared as described in Example 1, and sodium hydride suspension (450 mg. of a 54% suspension) in dry dioxan is refluxed for one hour. The mixture is cooled and then dimethylaminopropyl chloride (1.30 g.) is added. The mixture is refluxed for 3 hours, and then cooled and evaporated to dryness. The residue is partitioned between chloroform and dilute hydrochloric acid. The aqueous acidic phase is basified and then extracted with ether. The ethereal extracts are dried, evaporated to dryness and the title product is obtained as a gum characterized by its infrared absorption spectrum with maxima 2770, 1675, 1453, 970 and 923 cm.$^{-1}$.

The hydrochloric acid addition salt is prepared by treating the above product with either methanolic or ethereal hydrogen chloride. It is purified from isopropanol-ether to M.P. 111–116° C.

Example 4

In the same manner as described in Example 1, but using as starting material 12-ethyl-, 12-propyl-, 12-butyl-, 12-benzyl-, 12-β-phenethyl-, or 12-trimethoxybenzyl-11-hydroxy-10,5-(iminomethano) - 10,11 - dihydro - 5H-dibenzo[a,d]cyclohepten-13-one in place of 11-hydroxy-10,5-(iminomethano)-10,11-dihydro - 5H - dibenzo[a,d]cyclohepten-13-one, the corresponding 12-ethyl-, 12-propyl-, 12-butyl-, 12-benzyl-, 12-β-phenethyl-, or 12-trimethoxybenzyl-10,5-(iminomethano) - 10,11 - dihydro-5H-dibenzo[a,d]cycloheptene-11,13-dione is also obtained.

Example 5

In the same manner as described in Example 3, but using as starting material dimethylaminoethyl, diisopropylaminopropyl, piperidinoethyl, morpholinoethyl, or (N'-methylpiperazino)ethyl chloride or bromide or iodide in place of dimethylaminopropyl chloride, the corresponding 12-dimethylaminoethyl-, 12-diisopropylaminopropyl-, 12-piperidinoethyl-, 12-morpholinoethyl-, or 12-(N'-methylpiperazino)ethyl-10,5 - (iminomethano) - 10,11-dihydro-5H-dibenzo[a,d]cycloheptene-11,13-dione is also obtained. The hydrochloric acid addition salts of the above compounds are also obtained as described in Example 3, and the corresponding acid addition salts with sulfuric, oxalic, and maleic acid are obtained in the same manner.

We claim:

1. A compound selected from the group which consists of compounds of the formula

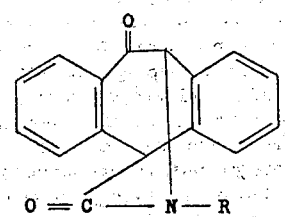

wherein R is selected from the group which consists of hydrogen, lower alkyl, benzyl, β-phenethyl, trimethoxybenzyl, di-loweralkylamino alkyl, piperidinoethyl, morpholinoethyl and (N'-methylpiperazino)ethyl; and acid addition salts of said compounds with pharmacologically acceptable acids.

2. 10,5-(iminomethano) - 10,11 - dihydro - 5H - dibenzo[a,d]cyclohepten-11,13-dione, as claimed in claim 1.

3. 12-methyl-10,5-(iminomethano)-10,11-dihydro - 5H-dibenzo[a,d]cyclohepten-11,13-dione, as claimed in claim 1.

4. 12-dimethylaminopropyl - 10,5 - (iminomethano) - 10,11-dihydro-5H-dibenzo[a,d]cyclohepten-11,13 - dione, as claimed in claim 1.

5. The hydrochloric acid addition salt of 12-dimethylaminopropyl-10,5-(iminomethano) - 10,11-dihydro - 5H-dibenzo[a,d]cyclohepten-11,13-dione, as claimed in claim 1.

References Cited

Waldmann et al., Leibeg's Ann., vol. 609, pp. 125–43 (1957).

HENRY R. JILES, *Primary Examiner.*

ROBERT T. BOND, *Assistant Examiner.*